United States Patent [19]

Blodgett et al.

[11] Patent Number: 4,879,946
[45] Date of Patent: Nov. 14, 1989

[54] APPARATUS FOR MATTING AND MILLING OF CHEESE CURD

[75] Inventors: Frank W. Blodgett; Paul R. Bokelmann, both of Fond du Lac, Wis.

[73] Assignee: Damrow Company, Inc., Fond du Lac, Wis.

[21] Appl. No.: 138,552

[22] Filed: Dec. 28, 1987

[51] Int. Cl.⁴ .................. A01J 25/00; A01J 25/11
[52] U.S. Cl. ...................... 99/453; 99/459; 99/465
[58] Field of Search .......... 99/452, 453, 456–459, 99/460, 461, 464–467, 462; 426/495, 491, 490, 582, 583; 198/575, 579, 577

[56] References Cited

U.S. PATENT DOCUMENTS

| | | |
|---|---|---|
| 2,980,538 | 4/1961 | Wolf . |
| 3,523,367 | 8/1970 | Czulak . |
| 3,543,403 | 12/1968 | Speglic et al. . |
| 3,562,909 | 2/1971 | Nikolic . |
| 3,636,630 | 1/1972 | Budahn . |
| 3,695,893 | 10/1972 | Czulak et al. . |
| 3,707,769 | 1/1973 | Syrjanen et al. ............ 99/452 |
| 3,772,786 | 11/1973 | Leonard ..................... 99/456 |
| 3,881,035 | 4/1975 | Tate ........................... 426/582 |
| 4,108,057 | 8/1978 | Hain et al. .................. 99/452 |
| 4,217,818 | 8/1980 | Hazen ......................... 99/456 |
| 4,309,941 | 1/1982 | Brockwell .................. 99/453 |
| 4,360,098 | 11/1982 | Nordstrom ................ 198/577 X |
| 4,510,856 | 4/1985 | Hammond et al. ........ 99/465 X |
| 4,538,510 | 9/1985 | Latimer et al. ............ 99/459 |
| 4,640,408 | 2/1987 | Eaves ......................... 198/577 X |
| 4,674,401 | 6/1987 | Goli ............................ 99/353 |

Primary Examiner—Timothy F. Simone
Attorney, Agent, or Firm—Andrus, Sceales, Starke & Sawall

[57] ABSTRACT

An apparatus for matting and milling cheese curd. A mixture of curds and whey is fed onto a porous endless belt of a first conveyor to form a layer of curds with the whey draining through the belt. As the leading end of the curd layer reaches the downstream end of the first conveyor, the speed of the first conveyor is reduced to match the speed of a second conveyor which is located at a slightly lower level than the first conveyor, so that the curd layer is transferred from the first conveyor to the second conveyor while the conveyors are operating at the same speed. A third conveyor is positioned beneath the second conveyor and operates at the same speed as the second conveyor. As the curd layer is transferred to the third conveyor it is inverted. A fourth conveyor is positioned beneath the downstream end of the third conveyor and the curd layer is transferred to the fourth conveyor while the fourth conveyor is operating at the same speed as the third conveyor. The curd layer is then discharged from the fourth conveyor to a curd mill which acts to cut the curd layer into cube-like chunks.

14 Claims, 3 Drawing Sheets

APPARATUS FOR MATTING AND MILLING OF CHEESE CURD

BACKGROUND OF THE INVENTION

In the past cheese, such as cheddar or colby, have been manufactured in an open top vat and after draining of the whey from the vat, the curd is cut into slabs or blocks which are hand turned or inverted and stacked to drain the residual whey from the slabs. Subsequently, the curd slabs are transferred to a curd mill where they are cut into cube-shaped chunks and the chunks are then transferred to hoops or drums for pressing and aging.

The conventional process, as used in the past, requires considerable manual labor in cutting and matting the curd slabs, and as the curd slabs are exposed during the matting process there is a possibility of contamination of the curd by outside materials.

U.S. Pat. No. 4,217,818 is directed to an apparatus for continuously matting and milling of cheese curd. In accordance with that patent, a pair of porous endless belt conveyors are mounted in superimposed relation in an enclosed housing. A mixture of cheese curd and whey is fed as a layer onto the belt of the upper conveyor and the whey is drained through the belt and discharged through the lower end of the housing. The curd layer is transferred from the discharge end of the upper conveyor to the lower conveyor and, as a result, is inverted. On discharge from the lower conveyor, the curd layer is fed to a curd mill which cuts the mat of curd into cube-like chunks.

In the usual cheese making plant, a number of curd forming vats may be utilized, and the mixture of curds and whey is then transferred from each vat to the continuous matting and milling apparatus. It is highly desirable to be able to unload each vat and eliminate the whey immediately after curd formation, because the prolonged presence of the whey can detrimentally effect the flavor characteristics of the cheese. With the cheddaring machine of U.S. Pat. No. 4,217,818, the rate of feed of curds and whey from a cheese-making vat to the cheddaring machine is dependent upon the speed of movement of the curd layer through the cheddaring machine.

SUMMARY OF THE INVENTION

The invention is directed to an improved cheddaring machine for continuously matting and milling of cheese curd. In accordance with the invention, an enclosed housing contains a plurality of porous belt conveyors and a quantity of curds and whey is fed from a cheese making vat onto the porous belt of a first conveyor to form a curd layer and the whey drains through the belt for discharge from the housing.

As the leading end of the curd layer reaches the downstream end of the first conveyor, the speed of the first conveyor is reduced to match the speed of a second conveyor which is located in an end-to-end relation with the first conveyor and is positioned at a slightly lower level. The curd layer is then transferred to the second conveyor while the two conveyors are operating at the same speed.

A third conveyor is superimposed beneath the second conveyor and operates at the same speed. The curd layer is discharged from the second conveyor to the third conveyor and in so doing, is inverted. A fourth conveyor is located in an end-to-end relation with a third conveyor and at a slightly lower level, and the curd layer is transferred to the fourth conveyor while the two conveyors are operating at the same speed.

On reaching the downstream end of the fourth conveyor, the curd layer is transferred to a curd milling unit which acts to cut the curd into cube-like chunks.

With the invention, the speed of the first in-feed conveyor can be substantially increased during feeding over the speed of the second and third conveyors where the matting and extraction of residual whey occurs. This enables a given quantity of curds and whey to be fed to the cheddaring machine in a shorter period of time. As the feeding time can be decreased, the whey can be more quickly removed from the curds after formation.

As a further advantage, the rate of speed of the fourth or discharge conveyor, can be varied to accommodate the operation of the curd mill, and yet a variation in speed of the discharge conveyor will not effect the residence time of the curd in the matting section.

The apparatus also includes an improved feeding mechanism which provides a more uniform curd layer on the conveyor. The curd layer is formed with a relatively square leading edge and the layer has a substantially uniform depth throughout the length of the layer. The square end and uniform thickness enables the curd layer to be milled into more uniform chunks with the formation of less fines.

As a further feature of the invention, an agitating mechanism, which can take the form of rotating stir fingers, is located above the first conveyor adjacent the feeding mechanism, and the rotating fingers serve to agitate the curd layer as it is layed down on the conveyor to aid in releasing whey from the interior of the curd layer or matt.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENTS

Figure 1:
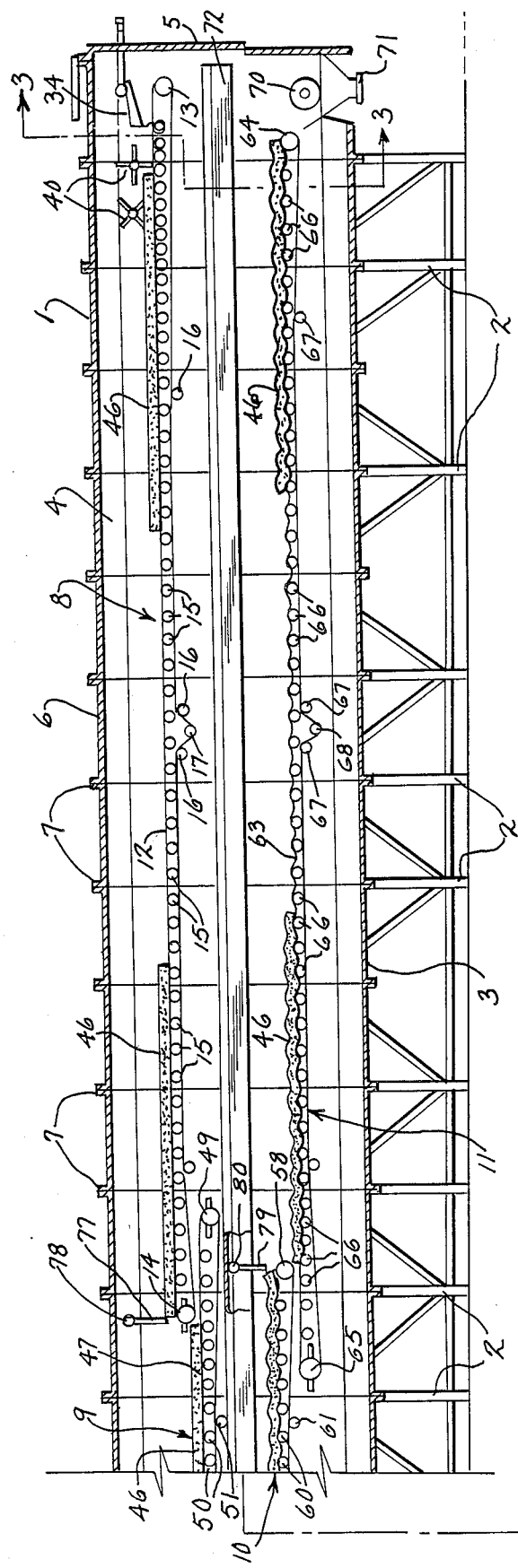
FIG. 1 is a vertical section of the apparatus of the invention.
Figure 1:
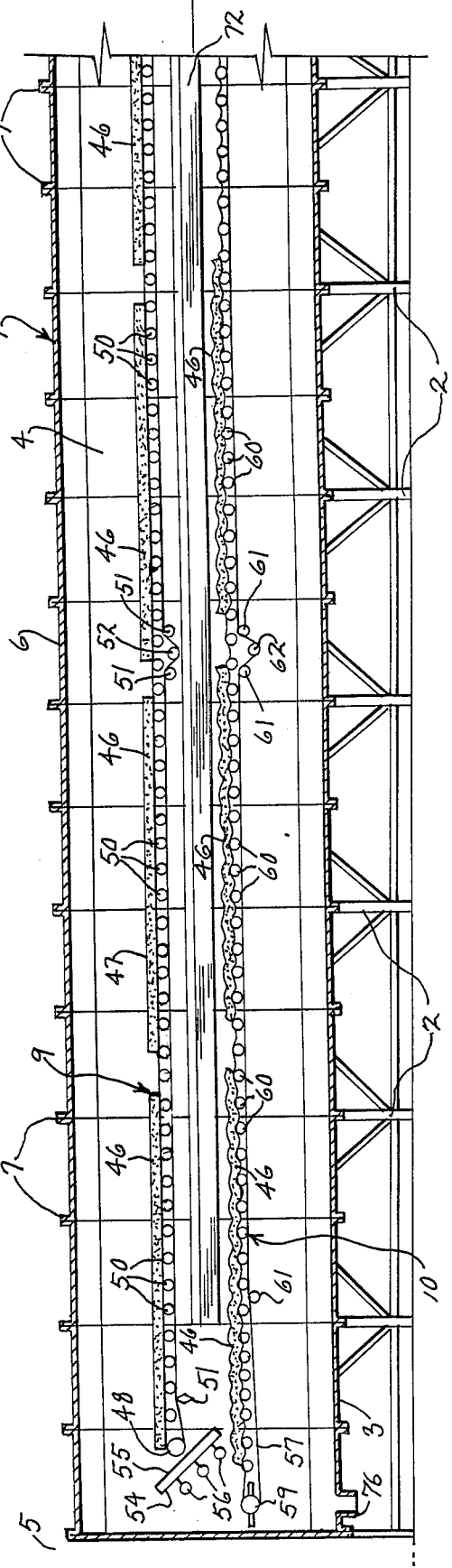

The drawings show a cheddaring apparatus for continuously matting and milling cheese curd. As shown in FIG. 1, the apparatus includes an enclosed housing 1 supported on a series of legs 2. Housing 1 consists of a bottom wall 3 formed of a pair of sloping surfaces which are joined together along a central valley or depression, a pair of side walls 4, a pair of end walls 5 and a top wall 6 which connects the upper edge portions of the side walls and end walls.

The walls of housing 1 are reinforced or stiffened by a series of ribs 7, and the ribs are formed by welding, or otherwise securing, outwardly extending flanges of the wall panels in a back-to-back relation. This construction provides a smooth inner surface for housing 1 and the welded flanges acts as stiffening ribs to reinforce the housing.

Located within housing 1 are four conveyors 8, 9, 10 and 11. The upper or infeed conveyor 8 includes an endless belt 12 formed of a porous or water permeable material and is mounted for travel on a drive roll 13 and an idler roll 14. Belt 12 is supported in its upper path of travel by a group of support rolls 15, and is similarly supported in its lower path of travel by a group of rolls 16. Tension is applied to belt 12 through use of a weighted roll 17 which is freely supported by the belt. By utilizing roll 17 of different weights, the tension on belt 12 cn be varied, so that the upper path of travel of the belt can be substantially planar or can be undulating, with the belt dipping as it passes between adjacent rolls 15.

The shafts of rolls 14, 15, and 16 are journalled within side walls 4 of housing 1 by bearing assemblies 18.

Figure 3:
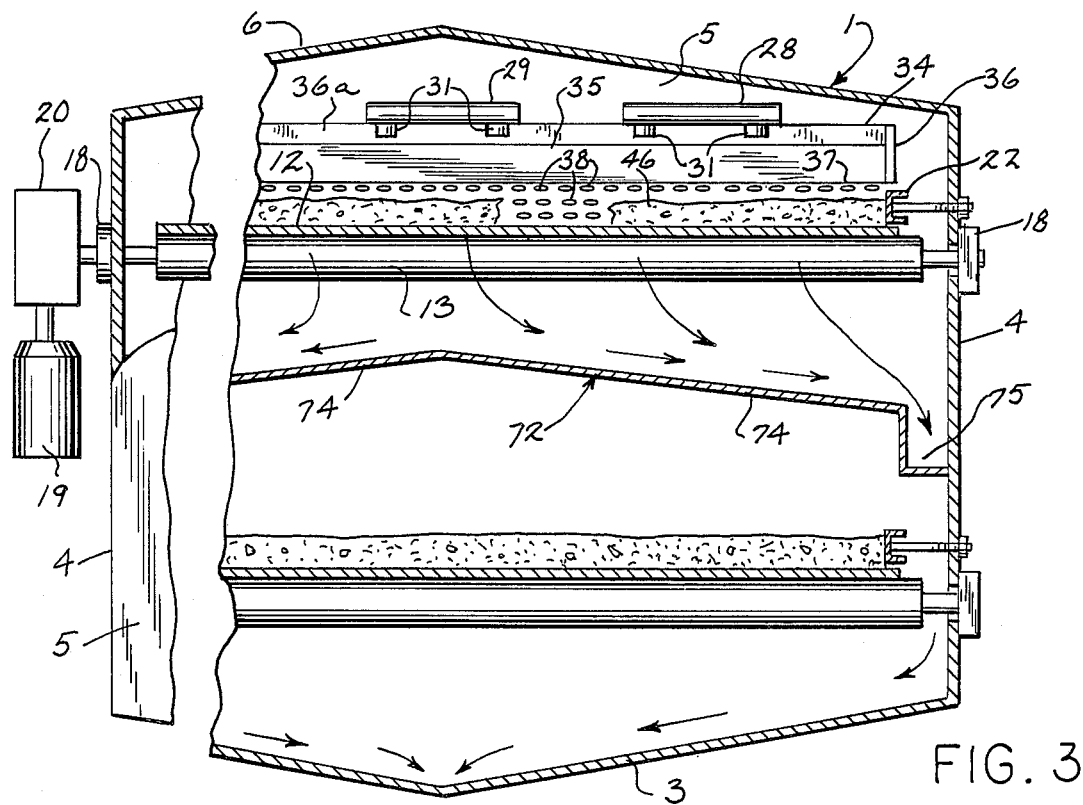
FIG. 3 is a view taken along line 3—3 of FIG. 1.

To drive belt 12, a variable speed hydraulic motor 19 is connected through a transmittion 20 to the shaft 21 of drive roll 13, as shown in FIG. 3. With this construction, operation of the hydraulic motor 19 will rotate drive roll 13 to move belt 12 in an endless path.

Side plates 22, as shown in FIG. 3, are mounted from each side wall 4 through suitable brackets and are positioned along the side edges of the belt 12 to retain the curd layer on the belt 12.

Figure 2:
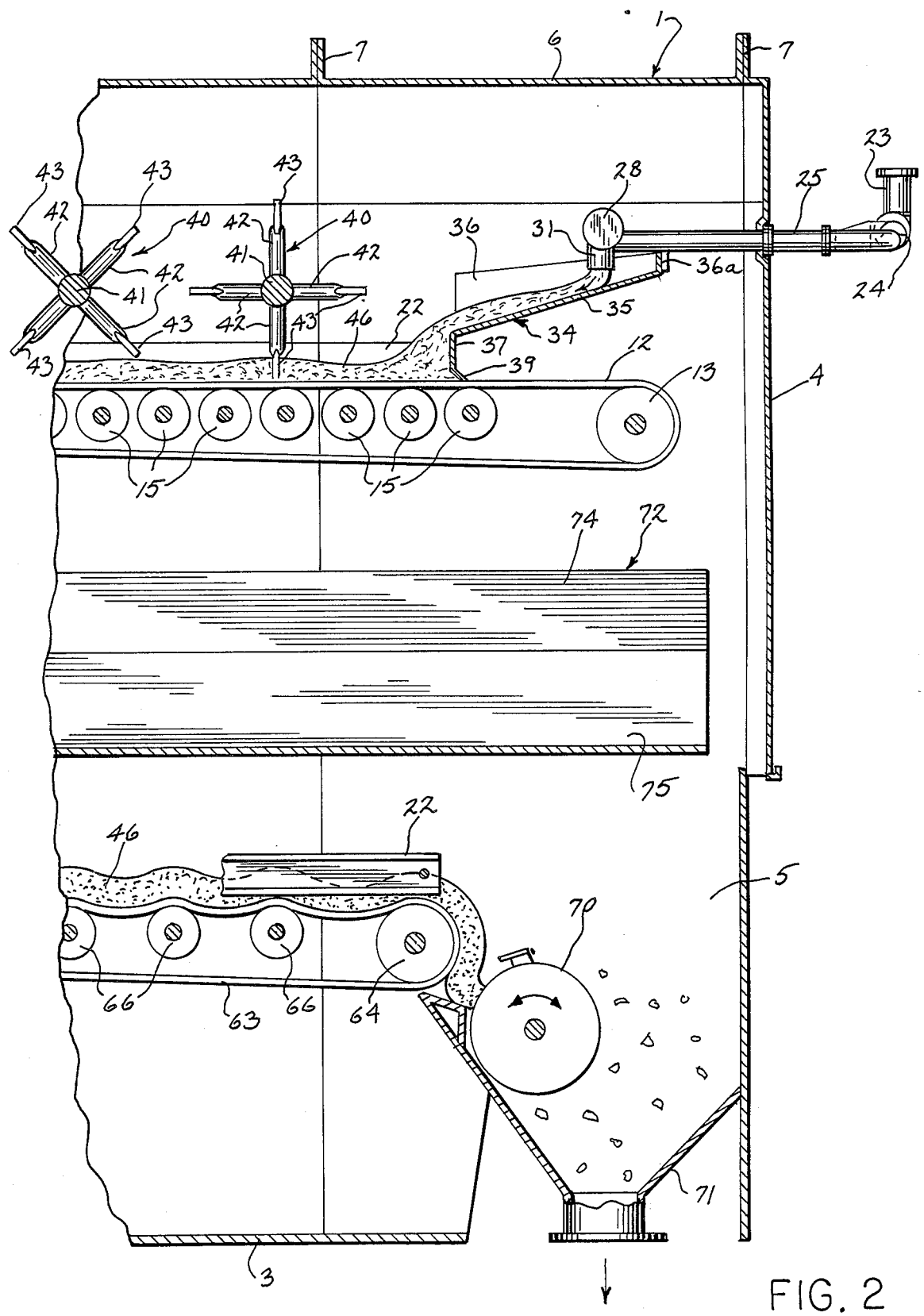
FIG. 2 is an enlarged fragmentary vertical section showing the feeding mechanism.
Figure 5:
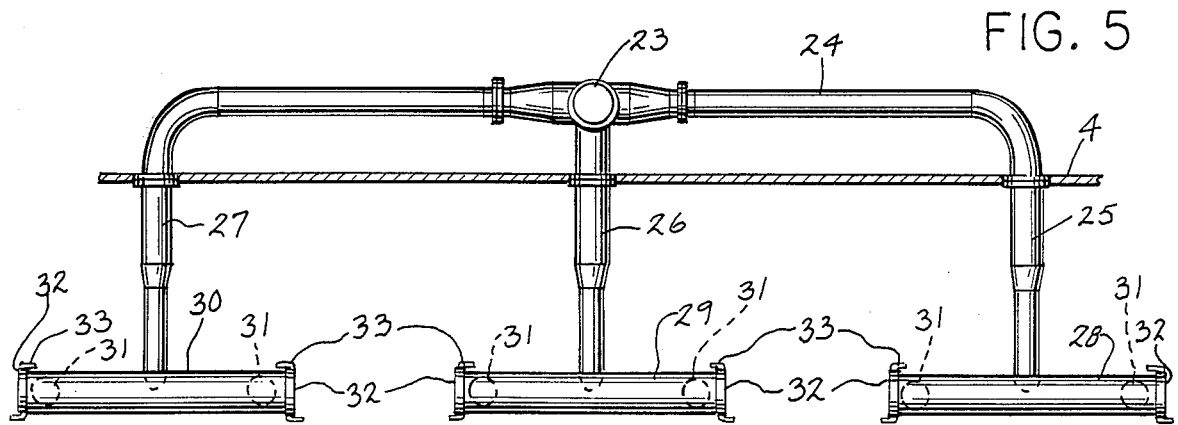
FIG. 5 is top plan view of the feeding manifold.

The curds and whey are supplied from one or more cheese making vats through a feed system, best shown in FIGS. 2, 3 and 5. Vertical pipe 23 is connected to a cheese making vat, and pipe 23 is connected to a horizontal inlet pipe 24, which, in turn, communicates with three manifolds 25, 26, 27 that extend through end wall 4. Each manifold is connected to a header 28, 29, 30 respectively, and the headers, as best shown in FIG. 5 are in spaced end-to-end relation. Each header is provided with a pair of downwardly facing outlets 31 through which the mixture of curds and whey is deposited onto the belt 12.

As best shown in FIG. 5, the ends of each header 28, 29 30 are enclosed by caps 32 which are retained in position by retaining wires 33.

Outlets 31 are located above the upper end of a sloping trough 34. Trough 34 is composed of a downwardly inclined bottom 35, a pair of side walls 36, and a rear end wall 36a. As shown in FIG. 2, the mixture of curds and whey being discharged from outlets 31 will flow downwardly along the bottom wall 34 onto belt 12. Extending downwardly from the lower end of bottom wall 34 is a baffle 37 havig a plurality of horizontally elongated perforations 38. The lower edge of baffle 37 defines an angular flange 39 which extends in an upstream direction with regard to the direction of movement of belt 12. Perforations 38 act to drain a portion of the whey from the curd mass, as the curd mass is transferred from trough 34 onto belt 12.

Figure 4:
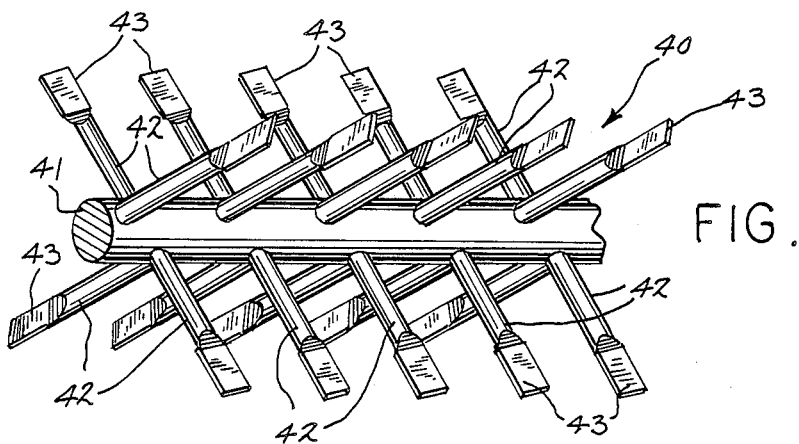
FIG. 4 is a perspective view showing the agitators for the curd layer.

A pair of agitators 40 are locted downstream of trough 34. As best shown in FIG. 6, each agitator 40 includes a horizontal shaft 41 that extends transversely across belt 12 and a plurality of radially extending fingers or tines 42 project outwardly from the shaft. As best shown in FIG. 4, the outer end of each tine is flattened, as indicated by 43, and the flattened ends are preferably located at an acute angle to the horizontal and vertical.

Each agitator 40 is rotated by a suitable hydraulic motor, not shown, which is mounted on the housing and is connected through a transmission to the respective agitating shaft 41.

The feeding mechanism acts to deposit a layer of curd 46 having a substantially square or transverse leading end and having a uniform thickness throughout its length. The square leading end is achieved through use of the headers 28-30, along with the outlets 31 and the trough 34. With this construction, the mixture of curds and whey is deposited relatively uniformly across the width of the trough and thus the layer of curds 46 will have a relatively square leading end.

It has been found that when a mixture of curds and whey is pumped from the cheese making vat to the cheddaring machine, the initial quantity of the mixture being supplied to the cheddaring machine will have a higher proportion of curds. When the cheese making vat is about three-quarters empty, the proportion of whey will increase. Because of this, the speed of travel of belt 12 is varied during the feeding operation to slow down movement of the belt when the cheese making vat is about three-quarters or 75% empty to thereby enable a curd layer 46 of substantially uniform thickness to be deposited on the belt. The change of belt speed is preferably controlled by a timing mechanism operably connected to motor 19.

As shown in FIG. 1, the downstream end of conveyor 8 overlaps the upstream end of conveyor 9 and the layer of curd 46 is transferred from conveyor 8 to conveyor 9. It is important that conveyors 8 and 9 be operating at the same speed when the curd layer is transferred and, therefore, the speed of conveyor 8, which normally operates as a faster speed during feeding, as will be hereinafter described, is reduced to equal the speed of conveyor 9 during the transfer.

Conveyor 9 is similar in construction to conveyor 8 and includes an endless porous or water permeable belt 47 which is mounted for travel on a drive roll 48 and idler roll 49. The upper run of belt 47 is supported by a plurality of parallel transverse support rolls 50, while the lower run of the belt is supported by rolls 51. A weighted tensioning roll 52, similar in construction and operation to weighted roll 17, is employed to provide the desired tension on belt 47. Belt 47 is independently driven, in the manner previously described, by a suitable hydraulic motor operating through a transmission which is connected to the shaft of drive roll 48. Side plates 22 which are supported from side walls 4 extend along the side edges of belt 47 to retain the curd layer 46 on the belt.

Conveyor 10 is located beneath conveyor 9 and as the curd layer or matt 46 is transferred from conveyor 9 to conveyor 10, it is inverted. The transfer mechanism includes an inclined plate 54 located beneath the drive roll 48 and the curd layer 46 being discharged from the upper conveyor 9 is deflected downwardly by plate 54 onto the lower conveyor 10. Side flanges 55 are associated with transfer plate 54 to guide movement of the layer or matt 46 as it is transferred. Inclined plate 54 is supported by a group of supports rods 56 which extend between side walls 4 of housing 1.

As the curd layer passes around the drive roll 48 and onto the inclined transfer plate 54, the curd is stretched and the stretching action aids in improving the body of the cheese.

Lower conveyor 10 has a length substantially equal to conveyor 9 and is similar in construction to conveyor 9. Conveyor 10 includes an endless porous or water permeable belt 57, which is mounted for endless travel on drive roll 58 and idler roll 59. The upper run of belt 57 is supported by a plurality of parallel support rolls 60, while the lower run is supported by rolls 61. A weighted roll 62, similar to roll 17 of conveyor 8, is employed to provide the proper tension on the belt 57. The shafts of rolls 58, 59, 60 and 61 are suitably journalled in bearing assemblies 18 in the side walls 4, and belt 57 is driven by a hydraulic motor drive operably connected to the shaft of drive roll 58, as previously described.

Conveyor 11 is positioned beneath conveyor 8 and has a length substantially equal to that of conveyor 8. As shown in FIG. 1, the downstream end of conveyor 10 extends over the upstream end of conveyor 11 and the layer of curd 46 is transferred from conveyor 10 to conveyor 11.

The construction of conveyor 11 is similar to that of conveyors 8-10, and includes a porous belt 63 which is trained over a drive roll 64 and an idler roll 65. The upper run of belt 63 is supported by a plurality of parallel rolls 66, while the lower run is supported by rolls 67. A freely suspended weighted roll 68 acts to provide the desired tension on the belt 63.

The shafts of rolls 64-67 are journalled within suitable bearing assemblies 18 in the side walls 4 of housing 1, and drive roll 64 is driven by a variable speed hydraulic motor unit, not shown and similar to that previously described.

Side plates 22 supported from side walls 4 extend along the side edges of belts 57 and 63 of conveyors 10 and 11 to retain the curd layer 64 on the belts.

By use of properly weighted rolls 62 and 68, the layer of curd 46 can be made to move in an undulating path on belts 57 and 63, as shown in FIGS. 1 and 2, thereby providing a stretching action for the curd layer.

The curd layer 46 being discharged from the downstream end of conveyor 11 passes through a curd mill 70 which can be similar in construction to that described in U.S. Pat. No. 4,089,243. Curd mill 70 acts to cut the layer of curds 46 into cube-like chunks and the cubes are then dischrged through the hopper 71.

Located beneath the upper conveyors 8 and 9 is a whey deflecting unit or roof 72. Roof 72 extends between side walls 4 of housing 1 and is composed of a pair of sloping surfaces 74 which meet along a central ridge. As shown in FIG. 3, the side edges of surfaces 74 communicate with troughs 75, which are located on the inner surfaces of side walls 4. Troughs 75 slope downwardly toward an end of housing 1. Whey draining through the porous belts 12 and 47 will fall onto the sloping surfaces 74 of roof 72 and drain down the surfaces to the troughs 75 for ultimate discharge through a drain 76 in the bottom wall 3 of housing 1.

Conveyors 8-11 can be operated at variable speeds, but in normal operation, conveyors 9 and 10 will be operating at the same speed. The speed of conveyors 9 and 10 is determined by the type of cheese being made and the speed, in turn, determines the residence time of matting.

When a cheese making vat is unloaded, it is fed through the feeding apparatus to form the curd layer 46 on conveyor 8 and the conveyor 8, at this time will be operating at a faster speed than conveyors 9 and 10. As previously noted, due to the fact that a given volume at the beginning of the feeding operation will contain a higher proportion of curd solids than subsequent portions as the vat is emptied, the speed of belt 12 will be reduced progressively after the vat is approximately three-quarters empty to provide a substantially uniform thickness for the curd layer 46.

Whey will drain from the mixture through perforations 38 as the mixture is deposited on belt 12 to form the curd layer 46, and additional whey will be extracted from layer 46 as it travels on belt 12, with the whey being deflected by roof 72 to troughs 75 for discharge from the housing 1.

As the curd layer 46 approaches the end of conveyor 8, the leading edge of curd layer 46 actuates arm 77 of switch 78 (See FIG. 1). Switch 78 is operably connected to motor 19 and actuation of the switch will reduce the speed of travel of belt 12 to a value equal to that of belt 17. Thus, the curd layer 46 will be transferred from conveyor 8 to conveyor 9, while both conveyors are operating at the same speed to thereby avoid any undue stretching of the curd layer during the transfer.

During the period when the layer 46 is transferred to conveyor 9, no feeding of the mixture of curds and whey onto conveyor 8 is occurring. When the trailing end of layer 46 passes beyond arm 77 of switch 78, the switch will be deactivated, thereby operating motor 19 to increase the speed of conveyor 8 to its original level. At this time a second quantity of curds and whey from a second cheese making vat can be introduced onto the conveyor 8 to form a second or succeeding curd layer 46.

As the each curd layer 46 approaches the end of conveyor 9, it is transferred and inverted onto conveyor 10. During the travel on conveyors 9 and 10, the curd is matted and residual whey is drained from the curd.

As the leading edge of the curd layer 46 approaches the end of conveyor 10, the leading end will engage arm 79 of switch 80 which is operably connected to the variable speed motor that drives pulley 64 of conveyor 11. Actuating the switch will operate the motor to vary the speed of belt 63, so that it operates at the same speed as belt 57. Thus, the curd layer 46 is transferred from conveyor 10 to conveyor 11 while both conveyors are operating at the same speed.

The speed of conveyor 11 depends on the speed of operation of the curd mill 70 and is adjusted so that there is a constant flow of the curd layer 46 to the mill. In most cases, the speed of the conveyor 11 will be greater than the speed of conveyors 9 and 10.

The apparatus of the invention enables a given quantity of curds and whey to be fed into the cheddaring machine in a shorter period of time by permitting the infeed conveyor 8 to operate at a faster speed than the matting conveyors 9 and 10. This reduces the retention time of the whey after curd formation and enhances the flavor characteristics of the cheese.

The speed of the discharge conveyor 11 can also be varied to accommodate the speed of operation of the curd mill. Thus, the rate of feed, as well as the rate of discharge, are not tied into the speed of movement of the curd layer through the matting section.

The feeding apparatus provides a more uniform layer of curd in which the layer has a relatively square leading and trailing end and has a substantially uniform thickness throughout its length. Uniformity of the curd layer improves the milling operation resulting in the production of a lesser quantity of fines or scrap.

The addition of the agitators or stirring fingers serves to release whey from the interior of the curd layer or matt immediately after the mixture is fed onto the feed conveyor.

Various modes of carrying out the invention are contemplated as being within the scope of the following claims particularly pointing out and distinctly claiming the subject matter which is regarded as the invention.

We claim:

1. In a continuous cheese matting apparatus first conveyor means including a first porous conveying member and having an upstream end and a downstream end, feed means for feeding separate quantities of curds and whey to the upstream end of said first conveyor means to form a plurality of curd layers that are spaced along the length of said first conveyor means, each curd layer having a leading end and a trailing end, said whey draining through said first porous conveying member, second conveyor means including a second porous conveying member and having an upstream end disposed at a lower level than the downstream end of said first conveyor means and disposed to receive each curd layer from the downstream end of said first conveyor means, means responsive to the leading end of each curd layer approaching the downstream end of said first conveyor means for varying the speed of said first conveyor means to approximate the speed of said second conveyor means so that each curd layer is transferred from said first conveyor means to said second conveyor means while said first conveyor means and said second conveyor means are operating at approximately the same speed.

2. The apparatus of claim 1, and including means responsive to the trailing end of each curd layer passing from said first conveyor means to said second conveyor means for increasing the speed of said first conveyor means.

3. In a continuous cheese matting apparatus, first conveyor means including a first porous conveying member and having an upstream end and a downstream end, first variable speed drive means for driving said first conveyor means, feed means for feeding separate quantities of curds and whey to the upstream end of said first conveyor means to form a plurality of curd layers that are spaced along the length of said first conveyor member, each curd layer having a leading end and a trailing end, said whey draining through said first porous conveying member, means for collecting the whey draining through said first conveying member, second conveyor means including a second porous conveying member and having an upstream end disposed at a lower level than the downstream end of said first conveyor means and disposed to receive each curd layer from the downstream end of said first conveyor means, second drive means for driving said second conveyor means, means responsive to the leading end of each curd layer approaching the downstream end of said first conveyor means for decreasing the speed of said firtst drive means to approximate the speed of said second drive means so that each curd layer is transferred from said first conveyor means to said second conveyor means while said first and second conveyor means are operating at approximately the same speed, and means responsive to the trailing end of each curd layer leaving said first conveyor means for increasing the speed of said first drive means to a speed faster than the speed of said second drive means.

4. The apparatus of claim 3, and including agitator means for agitating said curd layer on said first conveyor means to aid in draining whey from said curd layer.

5. The apparatus of claim 4, wherein said agitator means comprises a plurality of rotatable fingers constructed and arranged to rotate in contact with said curd layer.

6. A continuous cheese matting apparatus, comprising first conveyor means including a first porous conveying member and having an upstream end and a downstream end, feed means for feeding a mixture of curds and whey to the upstream end of said first conveyor means to form a curd layer having a leading end and a trailing end, second conveyor means including a second porous conveying member and having an upstream end disposed at a lower level than the downstream end of said first conveyor means and disposed to receive said curd layer from the downstream end of said first conveyor means, said whey draining through said first and second porous conveying members, third conveyor means disposed beneath said second conveyor means, transfer means for transferring said curd layer from the downstream end of said second conveyor means to the upstream end of said third conveyor means and inverting said curd layer during the transfer, fourth conveyor means having an upstream end disposed at a level beneath the downstream end of said third conveyor means and disposed to receive said curd layer from said third conveyor means, curd cutting means disposed at the downstream end of said fourth conveyor means for cutting the curd layer into chunks, means responsive to the leading edge of said curd layer approaching the downstream end of said first conveyor means for decreasing the speed of said first conveyor means to provide said first conveyor means with a speed approximating the speed of said second conveyor means so that said curd layer is transferred from said first conveyor means to said second conveyor means while said first and second conveyor means are operating at approximately the same speed, means responsive to the trailing end of said curd layer moving from said first conveyor means for increasing the speed of said first conveyor means, means responsive to the leading end of said curd layer approaching the downstream end of said third conveyor means for varying the speed of said fourth conveyor means to approximate the speed of said third conveyor means so that said curd layer is transferred to said fourth conveyor means while said third and fourth conveyor means are operating at approximately the same speed, and means responsive to the trailing end of said curd layer moving onto said fourth conveyor means for varying the speed of said fourth conveyor means to a value different from the speed of said third conveyor means.

7. The apparatus of claim 6, and including an enclosed housing, said first, second, third and fourth conveyor means being disposed within said housing, and whey draining means for draining whey from said housing.

8. The apparatus of claim 6, and including means for providing an undulating path of travel for at least one of said conveying members.

9. The apparatus of claim 6, and including means for providing an undulating path of travel for said third conveying means.

10. A continuous cheese matting apparatus, comprising first conveyor means including a first porous conveying member and having an upstream end and a downstream end, feed means for feed separate batches of curds and whey onto the upstream end of said first conveyor means to form separate longitudinally spaced curd layers, each curd layer having a leading end and a trailing end, second conveyor means including a second porous conveying member and having an upstream end disposed at a lower level than the downstream end of said first conveyor means and disposed to receive each curd layer from the downstream end of said first conveyor means, said whey draining through said first and second porous conveying members, third conveyor means including a third porous conveying member and disposed beneath said second conveyor means, transfer means for transferring each curd layer from the downstream end of said second conveyor means to the upstream end of said third conveyor means and inverting said layer during the transfer, fourth conveyor means having an upstream end disposed at a level beneath the downstream end of said third conveyor means and disposed to receive each curd layer from said third conveyor means, means responsive to the leading end of each curd layer approaching the downstream end of said first conveyor means for reducing the speed of said first conveyor means to approximate the speed of said second conveyor means so that each curd layer is transferred from said first conveyor means to said second conveyor means while said first and second conveyor means are operating at approximately the same speed, and means responsive to the leading end of each curd layer approaching the downstream end of said third conveyor means for varying the speed of said fourth conveyor means to approximate the speed of said third conveyor means, so that said curd layer is transferred to said fourth conveyor means while said third and fourth conveyor means are operating at approximately the same speed.

11. A feeding mechanism for feeding a mixture of curds and whey to a moving conveyor member, comprising receiving means disposed above said conveying member and including an imperforate downwardly sloping trough, supply means for supplying a mixture of curds and whey to said trough, and baffle means extending downwardly from the lower end of said sloping trough to a location immediately above said conveying member, and drainage port means in said baffle means for draining whey from said mixture.

12. The feed mechanism of claim 11, wherein said baffle means comprises a vertical plate.

13. The feed mechanism of claim 11, wherein said port means comprises a plurality of perforations in said baffle means.

14. The feed mechanism of claim 11, wherein said supply means comprises a plurality of outlets spaced across the width of said trough.

* * * * *